Sept. 3, 1957 W. A. FLAGG, JR 2,804,680
MOTOR FIELD CONSTRUCTION AND METHOD OF MAKING SAME
Filed Oct. 22, 1954 2 Sheets-Sheet 1
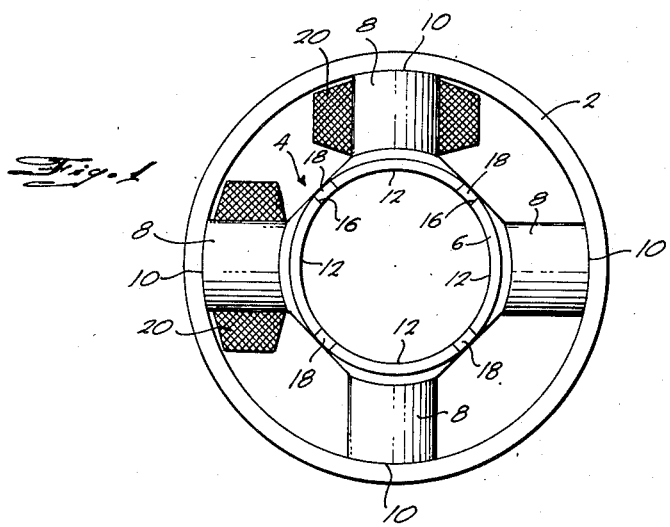
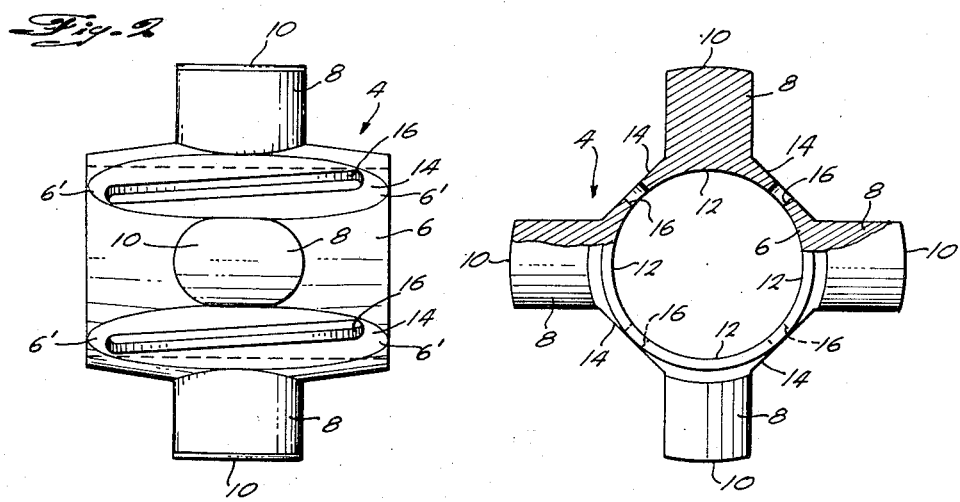
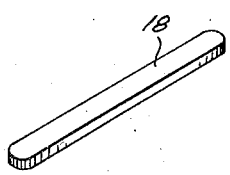
INVENTOR
WILLARD A. FLAGG, Jr.
BY
James and Franklin
ATTORNEYS.

Sept. 3, 1957 W. A. FLAGG, JR 2,804,680
MOTOR FIELD CONSTRUCTION AND METHOD OF MAKING SAME
Filed Oct. 22, 1954 2 Sheets-Sheet 2

INVENTOR.
WILLARD A. FLAGG, Jr.
BY
James and Franklin
ATTORNEYS.

United States Patent Office 2,804,680
Patented Sept. 3, 1957

2,804,680

MOTOR FIELD CONSTRUCTION AND METHOD OF MAKING SAME

Willard A. Flagg, Jr., Cochituate, Mass., assignor to National Pneumatic Company, Inc., Boston, Mass., a corporation of Delaware Application October 22, 1954, Serial No. 463,994

9 Claims. (Cl. 29—155.5)

The present invention relates to a novel construction for the stator field of an electric motor and to a method for making the same.

The stator fields of many types of electric motors comprise individual pole pieces having arcuate pole faces within which the rotor is adapted to rotate, the energizing coils for the stator field being wound about individual poles and a path of high magnetic permeability being provided between the ends of the poles radially remote from the pole faces. The magnetic characteristics of the stator field, and consequently the operation of the motor, will depend to a large extent upon the spacing between adjacent edges of the pole faces. Thus structural accuracy is important in the manufacture of motors of this type. Structural rigidity and dependability is also essential. Whenever the motor is operated some vibration results, and often the motor is utilized where external vibratory or shock forces are very significant factors. As a result the field structure must be sufficiently strong to withstand the conditions to which it will be subjected while in service.

A complicating factor in the design of structures of the type under discussion is the fact that coils must be individually wound about each pole piece. Conventionally this is done through the spaces between the adjacent edges of pole faces. However, those spaces are quite often exceedingly narrow, and it is very difficult for the winding needles of conventional winding machines to pass through those spaces at any appreciable rate of speed. Consequently winding of the coils on motors of the type under discussion, particularly small motors of the fractional horsepower type, is a fairly time consuming task, thus leading to a low rate of production. Moreover, even at low speeds improper coil winding occurs with discouraging frequency.

Production-wise, assembly of conventional stator field constructions, while mechanized to an appreciable degree, nevertheless often calls for a considerable amount of manual work. As is well known, this adds appreciably to the cost of the final product, particularly significant in a case of small motors produced in large numbers and sold in a highly competitive market.

In those cases where proper spacing between adjacent pole face edges is of particular importance, it has been the practice to manually install wedges of non-magnetic material between those edges. This appreciably slows down the production line and adds greatly to the cost of manufacture.

The motor field structure of the present invention is particularly designed to maximize the reliability and uniformity of operation of the motor and at the same time minimize the cost of manufacture thereof, particularly with regard to the assembly of the stator unit, including non-magnetic "wedges" between adjacent pole face edges. In particular, the main portion of the stator frame may be cast and then, after certain parts are secured thereto, machined and inserted into a previously formed outer ring of magnetizable material. A special feature of the instant structure is that the members which serve to space the pole pieces from one another at the pole faces also serve to support the pole pieces in assembled relationship until after they have been placed within the outer ring. In this way assembly is facilitated, close tolerances may be held, and an extremely rigid and dependable stator structure is produced. Moreover, because the radially outer ends of the pole pieces are exposed and are rigidly held in proper relative position before the central portion of the stator structure is inserted into the outer ring, coils may be wound on those pole pieces very conveniently and rapidly, the needles of the winding machine not having to pass through the narrow gaps between the pole pieces. This represents a signal improvement in production, since it increases rate of production and greatly reduces the number of rejects due to improper winding. Alternatively, prewound coils may be employed, something that is not possible with conventional stator constructions.

To accomplish these results the stator structure is formed of two independent parts, the outer ring and an inner spider defined by an inner ring with pole pieces projecting radially therefrom. The shape of the spider permits it to be manufactured very inexpensively, as by casting. Slots are formed in the inner ring of the spider between the radially outwardly projecting pole piece portions, those slots terminating short of at least one end of the inner ring so as to maintain the unitary nature of the spider. The slots serve to define the spaces between adjacent pole faces, the ring itself defining the pole faces. Strips of non-magnetic material are then inserted into the slots and are secured in place, preferably by being bonded to the edges of the slots, as by soldering, brazing or welding. Then the ends of the ring are machined down so as to expose the ends of the strips. Since the strips are themselves secured to the inner ring, they not only serve to space the pole faces from one another but also serve to hold them in position. The coils may then be wound on the outwardly radially extending pole piece portions, after which the entire spider is inserted into the outer ring, in which it is preferably a press-fit, and held in place either by virtue of that press-fit or in any other desired manner.

To the accomplishment of the above, and to such other objects as may hereinafter appear, the present invention relates to a method of making a motor field structure, and to the structure produced thereby, as defined in the appended claims and as described in this specification, taken together with the accompanying drawings, in which:

Fig. 1 is an end elevational view of the finished stator assembly, two of the field coils being omitted for the sake of clarity;

Fig. 2 is a view of the stator spider after the slots have been formed therein;

Fig. 3 is an end elevational view thereof, partially cross sectioned;

Fig. 4 is a three-quarter perspective view of one of the separator strips adapted to be inserted into the slots;

Figure 5:
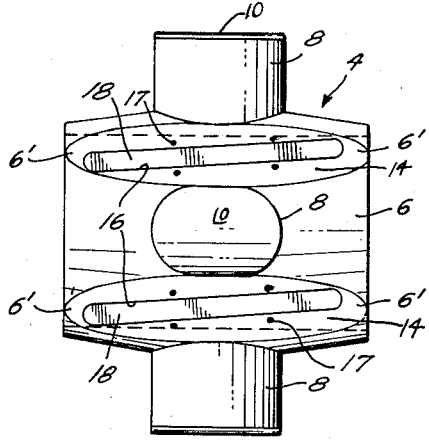
Fig. 5 is a view similar to Fig. 2 but showing the separator strips in place.

The stator structure of the present invention comprises an outer ring 2 and an inner spider generally designated 4 adapted to be inserted thereinto. Both are formed of any suitable magnetizable material of high permeability. The spider comprises an inner ring 6 from which a plurality of pole piece elements 8, here shown as four in number, project radially outwardly. The end surfaces 10 of these pole pieces are equally radially spaced from the axis of the ring 6 and are curved about that axis with a radius of curvature equal to their spacing from the axis. The inner surface of the ring 6 is cylindrical about the spider axis to define inner pole face surfaces 12 within which the rotor of the motor is adapted to rotate. The ring 6, as will clearly be seen from Fig. 2, extends longitudinally beyond the pole piece projections 8 on both sides thereof. If desired, and as here specifically disclosed, the outer surfaces of the ring 6 may be flatted at 14 between the pole piece projections 8. The entire spider 4 may be cast in one piece.

Slots 16 are formed in the ring 6 between the pole piece projections 8, those slots extending longitudinally beyond the projections 8 but short of the ends of the ring 6. As here disclosed the slots 16 are formed in the flatted portions 14 of the ring 6. These slots 16, as will become apparent hereinafter, serve to define and separate the individual pole faces 12. Consequently their width and orientation, and their positions relative to the pole piece projections 8, may be varied in order to produce a stator of desired design. As here disclosed the slots 16 are positioned substantially equidistantly between adjacent pole piece projections 8 so as to produce pole faces circumferentially symmetrical with respect to the projections 8. In addition, the slots 16 are here disclosed as angularly related to the axis of the ring 6 in order to produce skewed pole faces. The slots 16 may be formed during the casting operation, or they may be punched out from the ring 6 after the spider has been cast. As at present advised the latter procedure is preferred because it facilitates casting and produces slots to closer tolerances than if the slots were formed in the casting operation.

Next strips 18 of some appropriate non-magnetizable material are inserted into the slots 16. One material which has proved very effective is 18% nickel silver. The strips 18 are preferably of closely the same shape as the slots 16, and they are at least initially held in place in the slots 16 by means of staking 17 (see Fig. 5). Thereafter the strips 18 are firmly secured in place within the slots 16 and bonded to the edges of those slots. A standard brazing operation has been found quite effective in this regard, but welding or soldering could also be employed.

Figure 6:
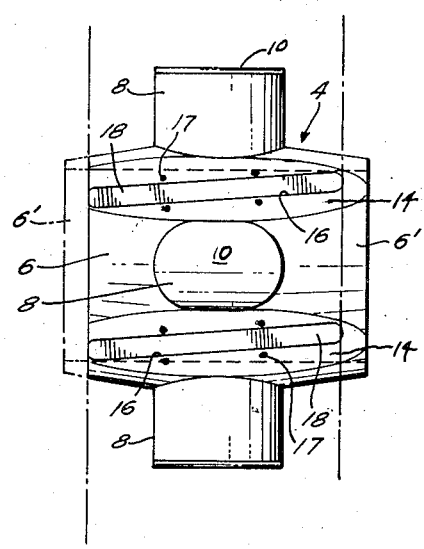
Fig. 6 is a view of the unit of Fig. 5 with one of the ends of the inner ring machined away.
Figure 7:
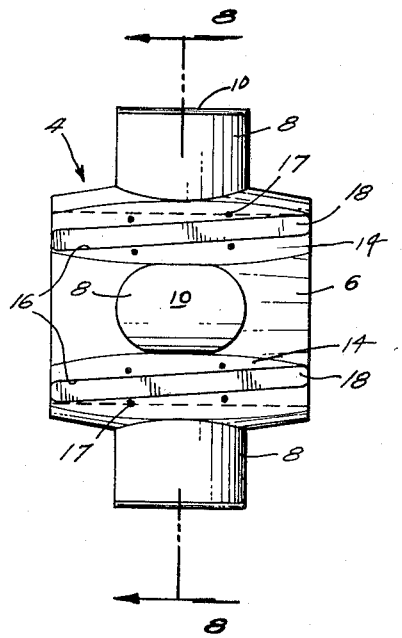
Fig. 7 is a view similar to Fig. 6 but with both ends of the inner ring removed.
Figure 8:
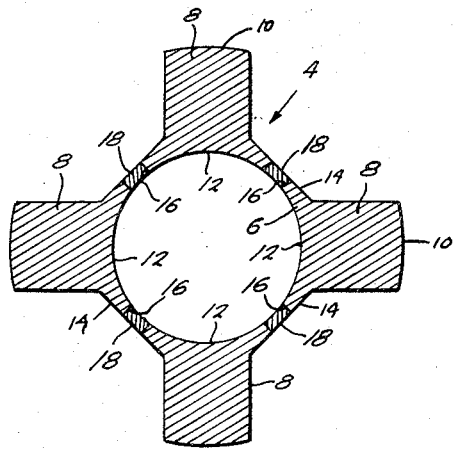
Fig. 8 is a cross sectional view taken along the line 8—8 of Fig. 7.

Thereafter those portions 6' of the ring 6 which project longitudinally beyond the ends of the slots 16 are removed by any suitable machining or cutting operation until portions of the strip 18 are exposed at both ends. Fig. 6 indicates in dot-dash lines a preferred degree of removal of the ring ends, the portion removed from the left hand end of the ring being shown also in dot-dash lines, the right hand ring portion being shown as not yet removed. Figs. 7 and 8 disclose the spider 4 after both ring portions 6' have been removed. Since the strips 18 are firmly bonded to the edges of the slots 16 within which they are received, it will be apparent that the strips 18 serve to hold the individual ring segments 6 in position, a function performed by the ring portions 6' when the ring was in the condition shown in Fig. 2. The removal of the magnetizable material defined by the ring portion 6' produces a series (here shown as four in number) of individual pole pieces 12 separated completely along their length by circumferential gaps 16 filled by the non-magnetizable material of which the strips 18 are formed.

It will be understood that the slots 16 could extend all the way to one end of the ring 6, provided that the rotor slotted ring portions 6' at the other end of the ring were of sufficient strength to hold the spider 4 rigidly together prior to insertion of the strips 18. In this case, of course, only one ring portion 6' would be present to be removed.

The spider 4 next has coils 20 wound about the individual pole piece projections 8. For purposes of clarity of illustration, these coils, cross sectioned, are shown only on two of the pole piece projections 8 in Fig. 1, but it will be understood that in the finished motor coils will be wound on all of the pole piece projections 8. The winding can be accomplished from the outside of the spider 4, and consequently no production problems are presented. In particular, the fact that the circumferential gaps between the individual pole faces are filled by the strips 18 has no effect on the winding operation, since the needles of the winding machine need not pass through those gaps. The free access of the pole piece projections 8 during the winding operation is a very important factor with respect to the significance of the instant invention. Alternatively, the coils may be wound on spools of insulating material and then those spools may be slid onto the pole piece projections 8. Production-wise this is the preferred method of coil winding for the structure of the present invention, since standard winding machines may be employed.

After this the spider 4, with the coils 20 in place, is inserted into the outer ring 2, the radially outer surfaces 10 of the pole piece projections 8 preferably fitting snugly against the inner surface of the outer ring 2, the radius of curvature of the surfaces 10 and of the inner surface of the ring 2 being substantially the same. In many cases a press-fit between the spider 4 and the ring 2 may be relied upon to retain the two units in proper assembled relationship. If desired the ring 2 may be heated to facilitate insertion of the spider 4, subsequent cooling of the ring 2 serving to firmly and reliably grasp the spider 4 and hold it in place. Auxiliary securing means could be employed, for example, screws could be passed through the shell 2 and into the pole piece projections 8, or welding could be employed to the same end.

The finished structure is entirely rigid, even insofar as the circumferential gaps between adjacent pole faces are concerned, and consequently it is substantially insensitive to vibration or shock. By the same token the magnetic characterictics thereof may be held to very close tolerances even in the case of quantity production. At the same time the manufacturing process is such as to minimize rejects and make for exceedingly low cost.

While but a single embodiment of the present invention has been here disclosed, it will be apparent that many variations may be made therein, for example, as to specific configuration and location of the various elements, all within the spirit of the invention as defined in the following claims.

I claim:

1. The method of making a motor field structure which comprises forming a magnetizable member comprising a ring of appreciable length having a plurality of elements extending radially outwardly therefrom, forming slots in said ring between said elements extending short of at least one end of said ring, securing pre-formed strips of different material in said slots, and removing the end of said ring so as to expose the ends of said strips, the remaining portions of said ring defining magnetizable pole pieces separated by said strips, said elements defining projections about which coils can be wound.

2. The method of making a motor field structure which comprises forming a magnetizable member comprising a ring of appreciable length having a plurality of elements extending radially outwardly therefrom, forming slots in said ring between said elements extending short of at least one end of said ring, placing pre-formed strips of different material in said slots, bonding said strips to the edges of said slots, and removing the end of said ring so as to expose the ends of said strips, the remaining portions of said ring defining magnetizable pole pieces separated and held together by said strips, said elements defining projections about which coils can be wound.

3. The method of making a motor field structure which comprises forming a magnetizable member comprising a ring of appreciable length having a plurality of elements extending radially outwardly therefrom, forming slots in said ring between said elements extending short of at least one end of said ring, placing pre-formed strips of different material in said slots, brazing said strips to the edges of said slots, and removing the end of said ring so as to expose the ends of said strips, the remaining portions of said ring defining magnetizable pole pieces separated and held together by said strips, said elements defining projections about which coils can be wound.

4. The method of making a motor field structure which comprises forming a magnetizable member comprising a ring of appreciable length having a plurality of elements extending radially outwardly therefrom, forming slots in said ring between said elements extending short of at least one end of said ring, said slots being inclined relative to the axis of said ring, securing pre-formed strips of different material in said slots, and removing the end of said ring so as to expose the ends of said strips, the remaining portions of said ring defining skewed magnetizable pole pieces separated by said strips, said elements defining projections about which coils can be wound.

5. The method of making a motor field structure which comprises forming a magnetizable member comprising a ring of appreciable length having a plurality of elements extending radially outwardly therefrom, forming slots in said ring between said elements extending short of at least one end of said ring, said slots being inclined relative to the axis of said ring, placing pre-formed strips of different material in said slots, bonding said strips to the edges of said slots, and removing the end of said ring so as to expose the ends of said strips, the remaining portions of said ring defining skewed magnetizable pole pieces separated and held together by said strips, said elements defining projections about which coils can be wound.

6. The method of making a motor field structure which comprises forming a magnetizable member comprising a ring of appreciable length having a plurality of elements extending radially outwardly therefrom, said ring extending longitudinally beyond said elements, forming slots in said ring between said elements and extending longitudinally beyond said elements but short of the ends of said ring, placing pre-formed strips of non-magnetizable material in said slots, bonding said strips to the edges of said slots, removing the ends of said ring so as to expose the ends of said strips, the remaining portions of said ring defining magnetizable pole pieces separated and held together by said non-magnetizable strips, winding coils on said elements, and inserting said structure into a second ring of magnetizable material having an inner radius substantially equal to the radius of curvature of said terminating element surfaces, said terminating element surfaces engaging the inner surface of said second ring.

7. The method of making a motor field structure which comprises forming a magnetizable member comprising a ring of appreciable length having a plurality of elements extending radially outwardly therefrom, said ring extending longitudinally beyond said elements, forming slots in said ring between said elements and extending longitudinally beyond said elements but short of the ends of said ring, placing pre-formed strips of non-magnetizable material in said slots, brazing said strips to the edges of slots, removing the ends of said ring so as to expose the ends of said strips, the remaining portions of said ring defining magnetizable pole pieces separated and held together by said non-magnetizable strips, winding coils on said elements, and inserting said structure into a second ring of magnetizable material having an inner radius substantially equal to the radius of curvature of said terminating element surfaces, said terminating element surfaces engaging the inner surface of said second ring.

8. The method of making a motor field structure which comprises forming a magnetizable member comprising a ring of appreciable length having a plurality of elements extending radially outwardly therefrom, said ring extending longitudinally beyond said elements, forming slots in said ring between said elements and extending longitudinally beyond said elements but short of the ends of said ring, said slots being inclined relative to the axis of said ring, placing pre-formed strips of non-magnetizable material in said slots, bonding said strips to the edges of said slots, removing the ends of said ring so as to expose the ends of said strips, the remaining portions of said ring defining skewed magnetizable pole pieces separated and held together by said non-magnetizable strips, winding coils on said elements, and inserting said structure into a second ring of magnetizable material having an inner radius substantially equal to the radius of curvature of said terminating elements surfaces, said terminating element surfaces engaging the inner surfaces of said second ring.

9. The method of making a motor field structure which comprises forming a magnetizable member comprising a ring of appreciable length having a plurality of elements extending radially outwardly therefrom, said ring extending longitudinally beyond said elements, forming slots in said ring between said elements and extending longitudinally beyond said elements but short of the ends of said ring, said slots being inclined relative to the axis of said ring, placing pre-formed strips of non-magnetizable material in said slots, brazing said strips to the edges of said slots, removing the ends of said ring so as to expose the ends of said strips, the remaining portions of said ring defining skewed magnetizable pole pieces separated and held together by said non-magnetizable strips, winding coils on said elements, and inserting said structure into a second ring of magnetizable material having an inner radius substantially equal to the radius of curvature of said terminating element surfaces, said terminating element surfaces engaging the inner surface of said second ring.

References Cited in the file of this patent

UNITED STATES PATENTS

| | | |
|---|---|---|
| 1,407,776 | Stone | Feb. 28, 1922 |
| 1,612,828 | Mudge | Jan. 4, 1927 |
| 1,957,380 | Barlow | May 1, 1934 |
| 2,038,419 | Cotterman | Apr. 21, 1936 |
| 2,188,398 | Bernard | Jan. 30, 1940 |
| 2,695,969 | Yates | Nov. 30, 1954 |

FOREIGN PATENTS

| | | |
|---|---|---|
| 595,048 | France | Sept. 25, 1925 |